United States Patent
Harrington

(10) Patent No.: US 6,438,270 B1
(45) Date of Patent: Aug. 20, 2002

(54) METHODS AND SYSTEMS FOR IMAGE SHARPENING

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/261,164

(22) Filed: Mar. 3, 1999

(51) Int. Cl.⁷ ................................................. G01C 3/08
(52) U.S. Cl. ........................................ 382/262; 358/428
(58) Field of Search ............................... 382/260–269; 358/1.9, 431, 428, 468

(56) References Cited

U.S. PATENT DOCUMENTS

| 4,663,655 A | * | 5/1987 | Freeman | 348/242 |
| 4,724,395 A | * | 2/1988 | Freeman | 327/552 |
| 5,644,386 A | * | 7/1997 | Jenkins et al. | 244/3.16 |

OTHER PUBLICATIONS

Akarun, Lale et al. "Adaptive Decimated Median Filtering", *Pattern Recognition Letters,* vol. 13, No. 1 (1992), pp. 57–62.

Brownrigg, D. R. K. "The Weighted Median Filter", *Image Processing and Computer Vision,* Haralick, Robert M., editor, vol. 27, No. 8, Aug., 1984.

* cited by examiner

Primary Examiner—Thomas D. Lee
Assistant Examiner—Stephen Brinich
(74) Attorney, Agent, or Firm—Oliff & Berridge, PLC

(57) ABSTRACT

Image sharpening methods and systems sharpen the edges of objects within images by comparing and replacing the pixel value for a pixel with the median of the original value of the pixel and two values obtained by linear extrapolation of one or more neighboring values on each side of the pixel. By performing the process for all or a plurality of the pixels of a stored image, objects within the image, when output, on a video monitor, paper or other display media, will be provided with sharpened edge characteristics. Thus, the displayed image will include a reduced quantity of edge ringing and a reduced quantity of noise amplification.

20 Claims, 10 Drawing Sheets

FIG. 6
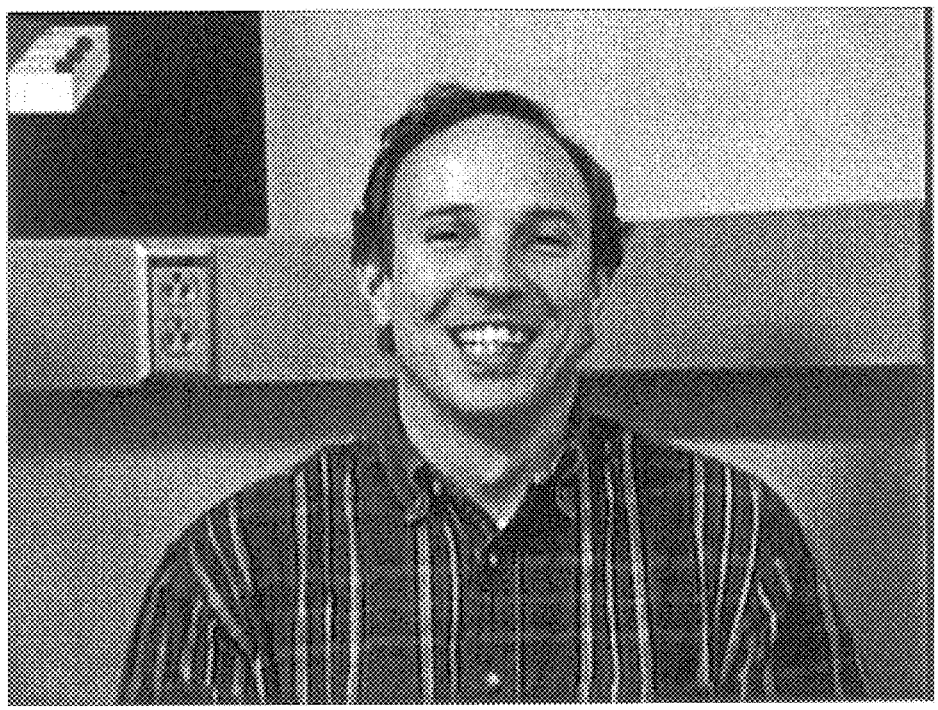
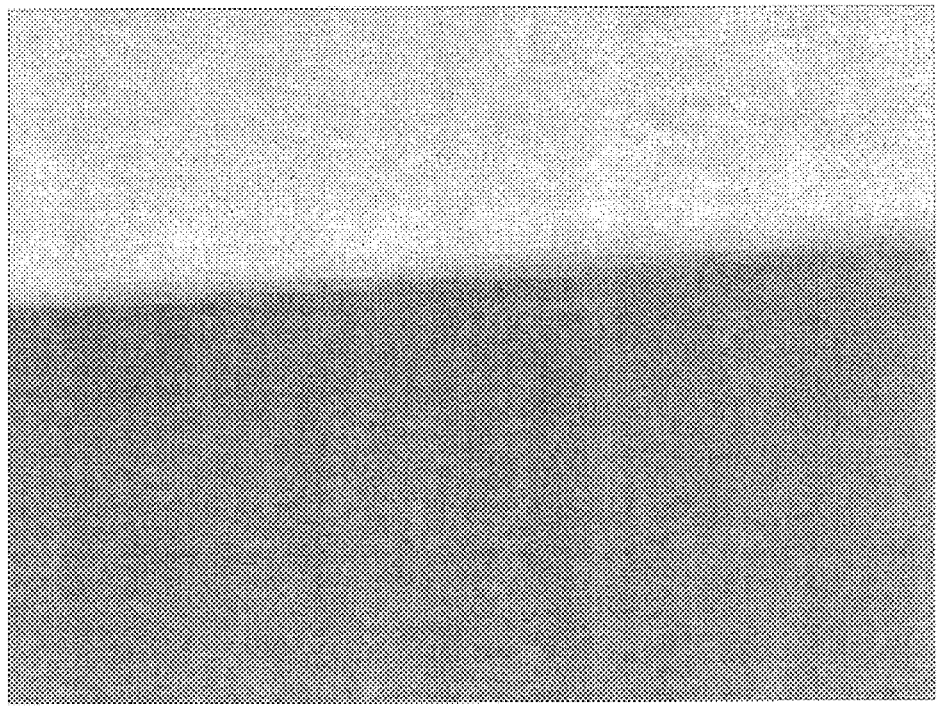
FIG. 7

FIG. 13
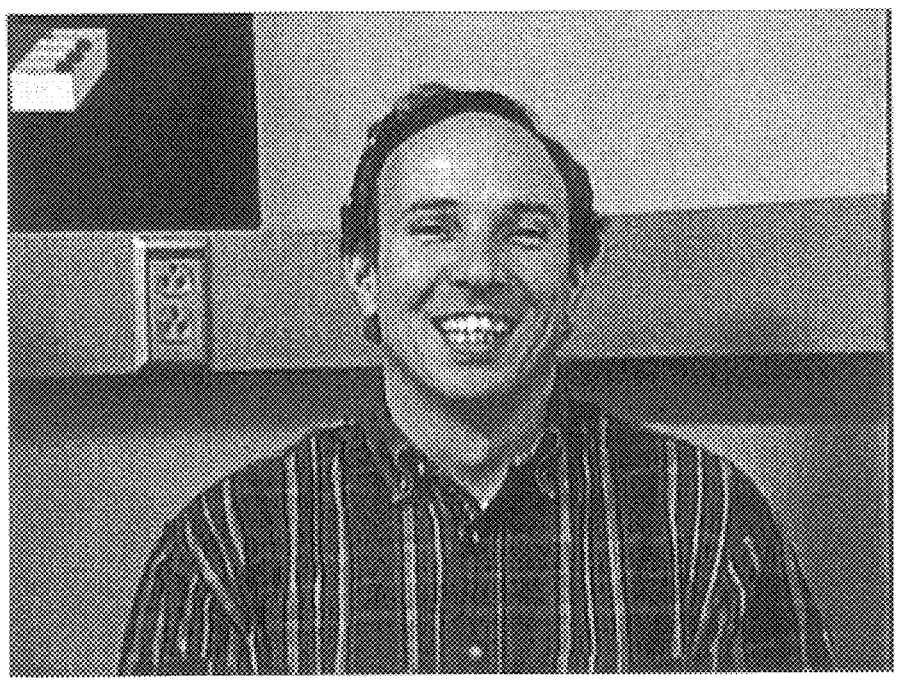
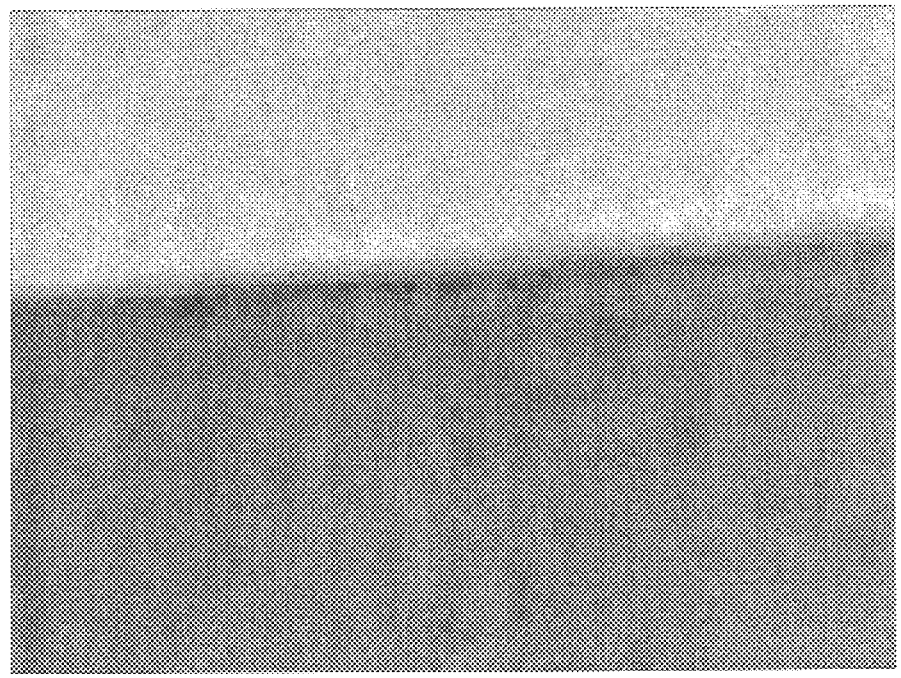
FIG. 14

FIG. 16
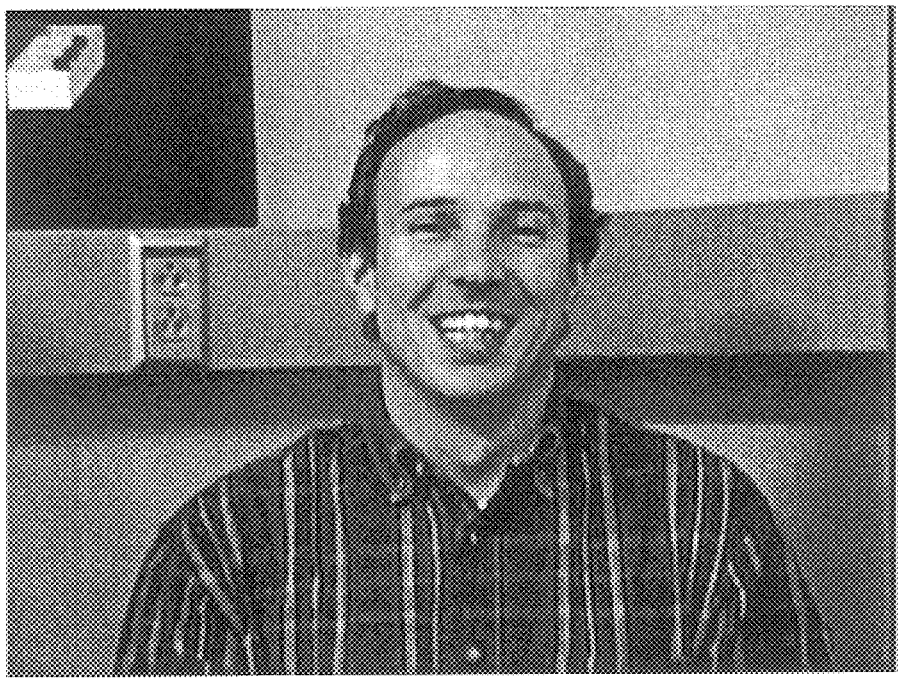
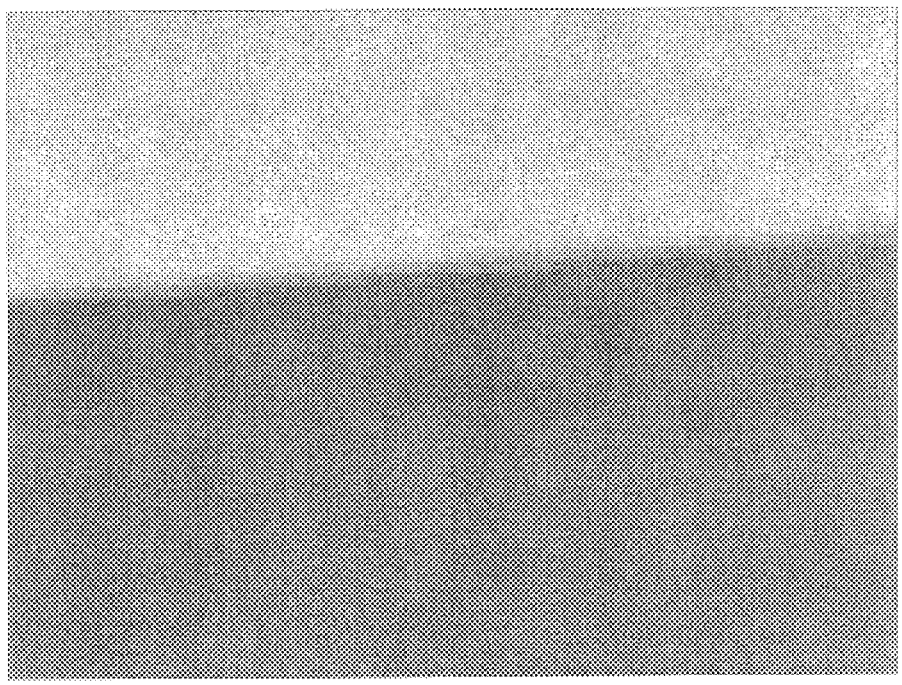
FIG. 17

METHODS AND SYSTEMS FOR IMAGE SHARPENING

BACKGROUND OF THE INVENTION

1. Field of Invention

This invention generally relates to processing an image. More particularly, this invention is directed to methods and systems that use a median filter to sharpen the edges of objects within an image.

2. Description of Related Art

Imaging devices generally use an electronic sensing device to capture images. Examples of electronic sensing devices include scanners, electrophotographic and videographic devices and medical imaging devices such as x-ray, catscan, NMR and the like. The images can be captured directly from an object, or indirectly from a medium, such as film. The electronic image data is organized and stored as a plurality of pixels which together make up a representation of an entire image. Each pixel is generally represented as one or more bits, such as a byte, of image data defining an image value for that pixel. The image value of each pixel represents a different color or the densities of one or more different colors, or, in a black and white system, a density ranging from black to white.

During capturing and storing an image, inaccurate or imprecise image values are often generated for various pixels within the image. This is particularly a problem around the edges of objects within images. In some edge lines, where there should be a dramatic difference between the image values for pixels on different sides of the edge, soft or blurred edges often occur. An edge can appear soft or blurred for several reasons, including poor focus, movement of the sensing device or of the object (or objects) being sensed, or the physical limitations of the sensing device. On a soft edge, the image color or intensity does not change abruptly from one pixel to the adjacent pixel, but rather shows up as incremental changes over several pixels.

The appearance of an image can often be improved by sharpening the edges of objects within the image. A conventional technique for image sharpening increases the high frequency components of the image through some type of feedback mechanism. This may be accomplished by a convolution with an edge enhancing filter or, alternatively and more efficiently, using error-diffusion techniques.

Median filters are commonly used to filter signals. "The Weighted Median Filter", D. R. K. Brownrigg, Image Processing and Computer Vision, R. Haralick, ed., Association for Computing Machinery, (1984) and "Adaptive Decimated Median Filtering", Lale Akurun et al., Pattern Recognition Letters 13, pp 57–62, January 1992, each incorporated herein by reference in its entirety, describe some applications of median filtering.

SUMMARY OF THE INVENTION

The conventional approaches to image sharpening have several limitations. The finite-sized filter that is often used may cause an over-compensation and "ringing" at the edge. This ringing is schematically illustrated in FIGS. 1–3. FIG. 1 illustrates the image values for eight adjacent pixels. The pixels may be vertically, horizontally or diagonally adjacent. The image values shown in FIG. 1 represent the color and/or intensity of each of the eight pixels for the "true" image. The "true" image has an edge between the fourth and fifth pixels. This is represented by the sharp numerical drop in the image values between the first four pixels, which may all be at one color or density, and the last four pixels, which are at a different color or density. However, because a conventional sensing device is often not sensitive enough to record such a sharp change, or because the sharp change is not accurately recorded for some other reason, a soft and/or blurred image edge occurs in the recorded image. For the soft and/or blurred image, the image values for the eight pixels do not change abruptly from one pixel to the next, as in FIG. 1, but, instead, change incrementally over several pixels. In the example illustrated in FIG. 2, for the eight pixels having the "true" image values shown in FIG. 1, the image values actually recorded and stored for these eight pixels change incrementally over the eight pixels.

FIG. 3 illustrates the over-compensation and "ringing" that occurs in the image values of these eight pixels at the edge of an object when using a conventional finite-sized filter to sharpen the image.

Also, due to noise, a sensing device occasionally incorrectly records a "bad" image value for one or more pixels. FIG. 4 illustrates the image values for another set of nine pixels, where the image value for the fifth pixel value contains noise. Noise may be incidentally recorded anywhere in the image. Using one of the conventional sharpening techniques, the noise may actually be enhanced. This is illustrated in FIG. 5, which shows the image values for the nine pixels shown in FIG. 4 after the portion of the image they represent has been sharpened by one of the conventional sharpening techniques.

FIG. 6 shows an unenhanced image that has been captured, stored and printed using conventional techniques. FIG. 7 shows an enlarged portion of the unenhanced conventional image of FIG. 6 showing in detail a recorded soft edge. FIG. 8 shows an image similar to that of FIG. 6 after being enhanced using a conventional enhancing image. FIG. 9 is an enlarged portion of the conventionally enhanced image of FIG. 8, showing the "ringing" at the edge and the enhanced noise, which is located both nearby and away from the edge.

This invention provides systems and methods that improve images without creating ringing artifacts or enhancing noise.

This invention separately provides methods and systems that use a median filtering to improve images without creating ringing artifacts or enhancing noise.

This invention separately provides systems and methods that improve the sharpness of an image by sharpening edges in the image.

This invention separately provides methods and systems in which the median filtering is accomplished by estimating an image value for a selected target pixel by taking the median of the image value measured for the specified target pixel, and of a first image value predicted from the image values of pixels on one side of the selected target pixel and a second image value predicted from the image values of pixels on an opposite side of the selected target pixel.

One exemplary embodiment of the median filter image sharpening methods and systems of this invention includes an image storing device that stores at least some of the image as a plurality of pixels. The median filter compares the measured image value for one of the pixels with image values determined from the image values of neighboring pixels. The filter considers image values from some or all of the eight immediately adjacent pixels (left, right, above, below, diagonal above left, diagonal above right, diagonal below left and diagonal below right), and also of the image values of one or more pixels immediately-adjacent or near to the eight immediately adjacent pixels.

In one exemplary embodiment of the image sharpening methods and systems of this invention, an original image value for a selected target pixel is compared with a first calculated image value determined from, for example, the image values of the two pixels directly to the left of the selected target pixel and the image values for the two pixels directly to the right of the selected target pixel. The median of the three pixels' image values is selected to replace the original image value for the target pixel. This process is repeated for each pixel. Alternatively, this process is repeated for a representative number of pixels. The process can also be repeated using the image values for pixels above and below a selected target pixel, and also for the image values for pixels diagonally adjacent to the selected target pixel. Alternatively, rather than comparing the image value of the selected target pixel individually with the image values of one or more of the vertically, horizontally and diagonally neighboring pixels, a determination based on the image values for all eight of the neighboring pixels, and the image values of pixels that neighbor those eight can be used at the same time.

In another exemplary embodiment of the image sharpening methods and systems of this invention, the image values used to determine the median image value used to replace the image value for the selected target pixel also include the original image values for the adjacent pixels. Thus, if the image value for the horizontally adjacent pixels are used, the replacement image value for the target pixel will be the median of the original image value for the selected target pixel, the image values interpolated from the pixels to the left and right of the target pixel and the original image values of the left and right adjacent pixels. Again, the process can be repeated for vertically and diagonally adjacent pixels, and the process can alternatively be done with all of the neighboring pixels at one time.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following drawing figures, in which:

FIG. 6 is an unenhanced image that has been captured, stored and printed using conventional techniques;

FIG. 7 is an enlarged portion of the unenhanced conventional image of FIG. 8 showing in detail a recorded soft edge;

FIG. 13 is an image enhanced using one method of image enhancement in accordance with one exemplary embodiment of the image enhancing method of this invention;

FIG. 14 is an enlarged portion of the image of FIG. 13, showing in detail the enhancement provided by the exemplary embodiment of this invention;

FIG. 16 is an image enhanced using one method of image enhancement in accordance with one exemplary embodiment of the image enhancing method of this invention;

FIG. 17 is an enlarged portion of the image of FIG. 16 showing in detail the enhancement provided by the exemplary embodiment of this invention;

DETAILED DESCRIPTION OF PREFERRED EMBODIMENTS

Figure 10:
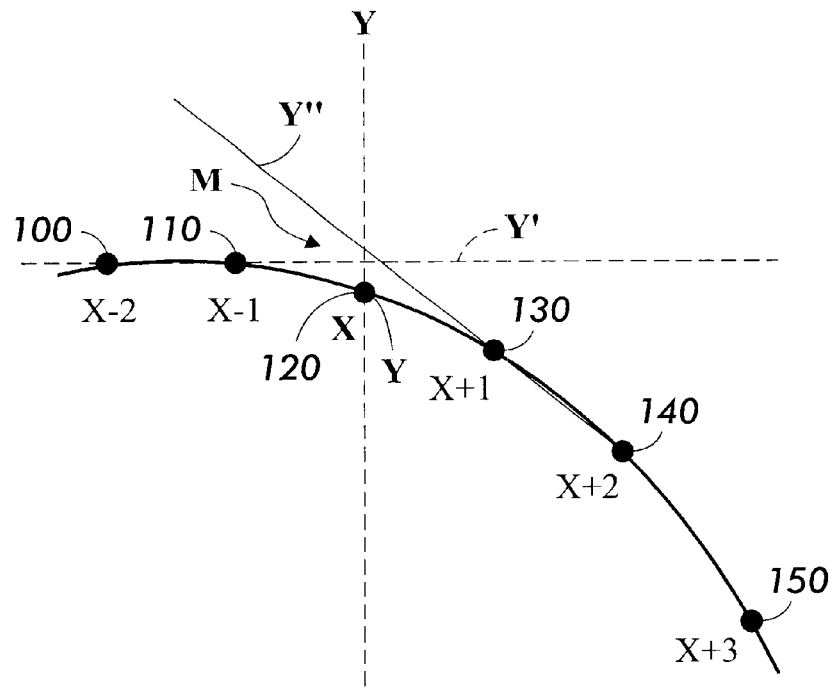
FIG. 10 illustrates one exemplary embodiment of the process for modifying the image value of a pixel at an edge based on the image values of a series of adjacent pixels in accordance with this invention.

FIG. 10 generally illustrates one exemplary embodiment of the image enhancing method and system of this invention such as the median filter system 200 as applied to a series of six adjacent pixels. The six adjacent pixels may be horizontally, vertically or diagonally adjacent. As shown in FIG. 10, the horizontal axis represents the spatial location of the pixels in the image, while the vertical axis represents the image values for the pixels in the image. In particular, as shown in FIG. 10, the selected target pixel 120 at a relative spatial location X has an initial pixel value y. This initial pixel value for the target pixel 120, for example, is selected to be "revalued" using the systems and methods of this invention to enhance the image containing the target pixel 120. The systems and methods of this invention can replace the value of each pixel with a median of its current value and two or more predicted values. The predictions can be linear extrapolations of the image values of the target pixel's neighboring pixels. Thus, to enhance the image value y of the target pixel 120, a straight line from the image value of the pixel 100 at the relative spatial position X−2 through the image value of the pixel 110 at the relative spatial position X−1 is linearly extrapolated to determine a first extrapolated image value y' at the spatial position X of the target pixel 120. Similarly, a straight line from the image value of the pixel 140 at the relative spatial location X+2 through the image value of the pixel 130 at the relative spatial location X+1 is linearly extrapolated to determine a second extrapolated image value y" at the spatial position X of the target pixel 120. The respective extrapolated values can be considered to be lying along lines tangent to a curve drawn through the image values for the pixels 100–150 at the pixels 100 and 140. The extrapolated lines produce two alternate image values y' and y" for target pixel 120 that act to sharpen the edge in comparison to the soft edge of the original of pixel value y for the target pixel 120.

Then the three values for the image value of the target pixel 120, the initial image value y, the first extrapolated image value y' and the second extrapolated image value y" are compared. The median of the three image values y, y' and y" is selected to replace the initial image value y. Thus, one of the extrapolated image values y' or y" will, at least some of the time, replace the initial image value y to make the image appear sharper. By repeating this process for each of the original pixel values, the image tends to transform into regions of linearly varying intensities. There is therefore a much smaller tendency for overshooting and ringing along edges.

Figure 1:
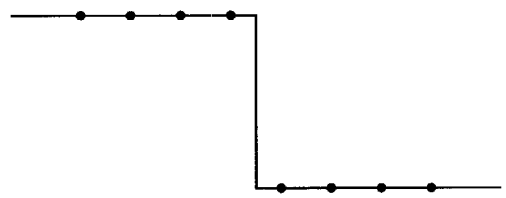
FIG. 1 illustrates the image values of a series of eight adjacent pixels located about a sharp edge in an image.
Figure 2:
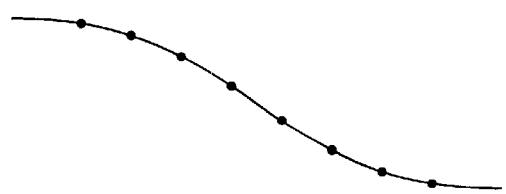
FIG. 2 illustrates the image values for the eight adjacent pixels of FIG. 1, after being captured and stored as a soft edge.
Figure 3:
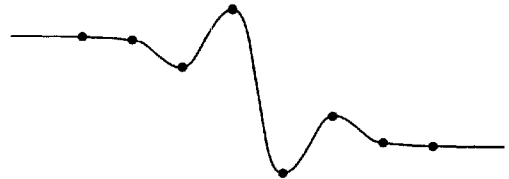
FIG. 3 illustrates the image values for the eight adjacent pixels of FIG. 2, after the values have been filtered through a conventional enhancement process.
Figure 4:
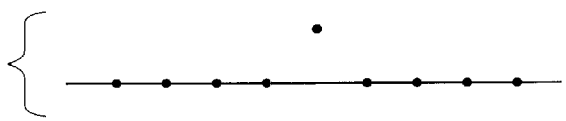
FIG. 4 illustrates the image values of a series of nine pixels after an image has been captured and stored, with the image value of the fifth pixel containing noise.
Figure 5:
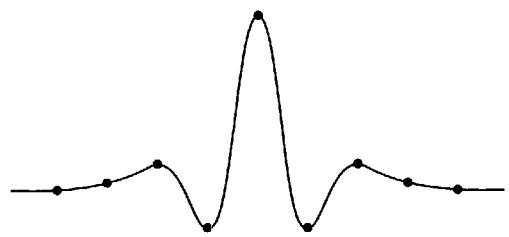
FIG. 5 illustrates the image values of the nine pixels shown in FIG. 4, after the image values have been filtered through a conventional enhancement process, showing enhancement of the noise in the image value of the fifth pixel.
Figure 11:
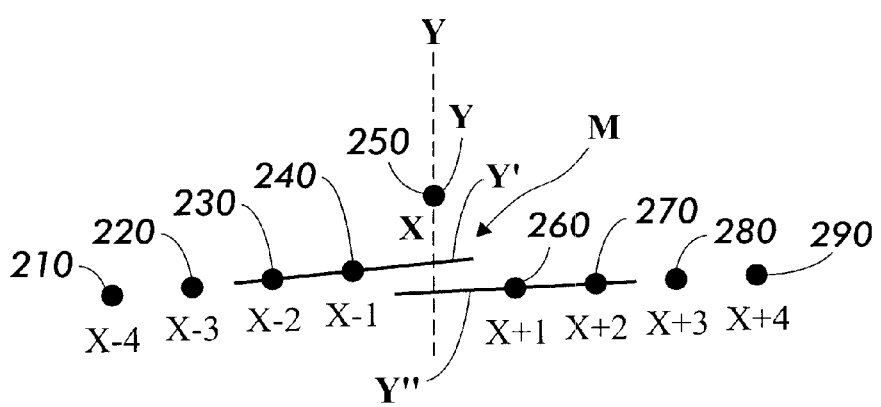
FIG. 11 illustrates one exemplary embodiment of the process for modifying a image value of a noisy pixel based on the image values of a series of pixels in accordance with this invention.

With regard to the "salt-and-pepper" type of noise shown in FIGS. 4 and 5, rather than enhancing the noise as in the conventional methods, the methods and systems of this invention actually reduce the noise, as illustrated in FIG. 11. As shown in FIG. 11, target pixel 250 has a value y which contains noise and thus does not accurately reflect the true image value of this pixel of the image. Using the systems and methods of the invention, two straight lines are again extrapolated, from the image values of the pixels 230 and 240 on one side of the target pixel 250 and from the image values of the pixels 260 and 270 on the other side of the target pixel 250. These two extrapolated lines have extrapolated image values y' and y", respectively, at the spatial position X of the target pixel 250 based on the image values and spatial positions X–2 and X–1 of the pixels 230 and 240 and the image values and spatial positions X+1 and X+2 of the pixels 260 and 270. Again, the median one of the image values y, y' and y" is selected and used in place of the original image value y for the target pixel 250.

Figure 12:
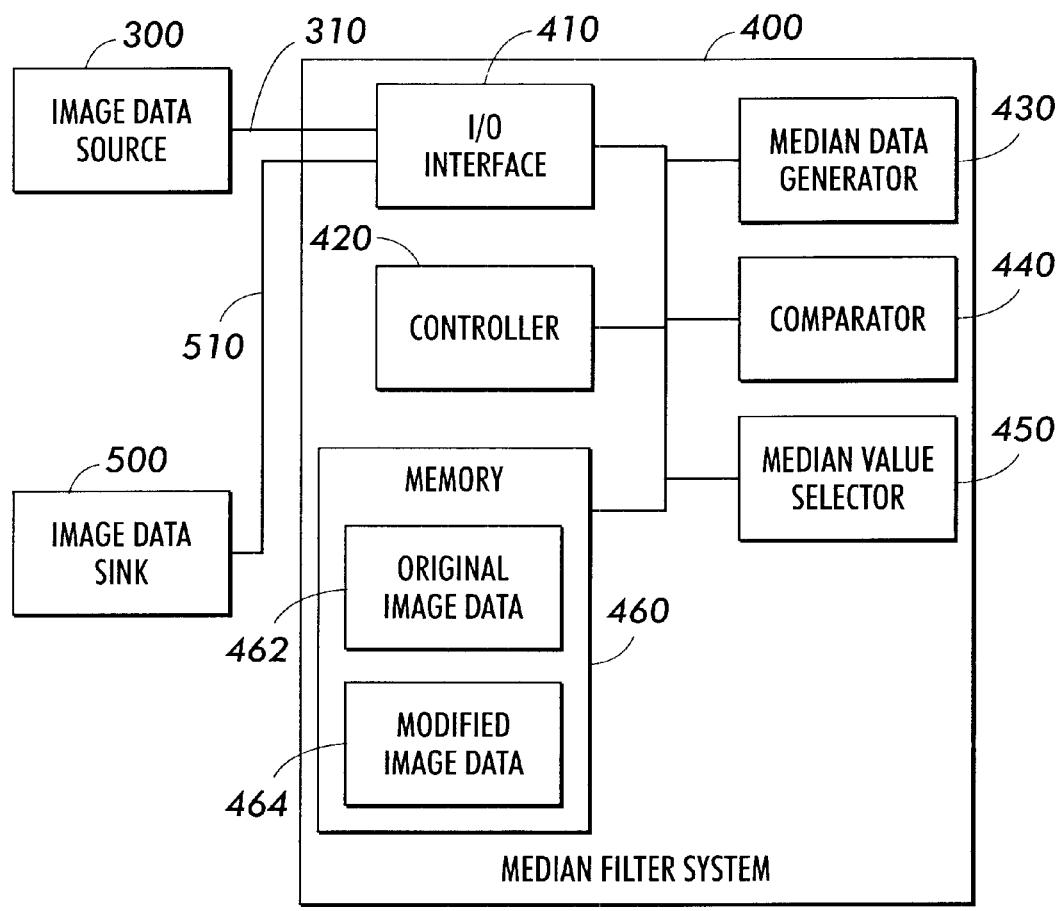
FIG. 12 is a functional block diagram outlining in greater detail one exemplary embodiment of the image enhancement system according to this invention.

FIG. 12 is a functional block diagram of one exemplary embodiment of a system for imaging in accordance with this invention. Images are input from an image data source 300 over a signal line or link 310 to a median filter system 400. The filtered images are output from the median filter system 400 over a signal line or link 510 to an image data sink 500. The median filter system 400 includes an input/output interface 410, a controller 420, a median data generator 430, a comparator 440, a median value selector 450 and a memory 460. The memory 460 includes an original image data portion 462 and a modified image data portion 128.

The median data generator 430 extrapolates the image values of the neighboring pixels to the target pixel as described above with respect to FIGS. 10 and 11, and as described below with respect to Equations 1–8 and the methods outlined in FIGS. 18 and 19, and generates the sets of predicted median image values. The comparator 440 compares the predicted image values in the set of predicted median images. The median value selects one of the sets of predicted median image values based on the comparison results generated by the comparator.

In operation, image data is input from the image data source 300 into the input/output interface 410 and stored into the original image data portion 462 of the memory 460 under the control of the controller 420. The controller 420 picks, one at a time, a number of target pixels from the original image data stored in the original image data portion 462. The median data generator 430, under control of the controller 420, generates, the sets of predicted median image values for each target pixel. The sets or median data for each target pixel are stored in the memory 460, or they could be forwarded directly to the comparator 440. The comparator 440, under control of the controller 420, inputs pairs of the predicted median image values from the memory 460 and compares them to generate comparison results indicating the relationship between the selected pairs of predicted median image values. The median value selector 450, under the control of controller 420, and based on the comparison results of the comparator 440, selects one of the sets of predicted median image values as the median image value to be used as the image value for the target pixel, and stores the selected median value as the image value of the target pixel in the modified image data portion 464.

The processed or modified image data stored in modified image data 464 is output by input/output interface, under the control of controller 420 to the image data sink 500. The image formed by the modified image data can be displayed on a display or printed by a printer onto a recording medium or otherwise stored on a recording medium.

As shown in FIG. 12, the median filter system 400 can be implemented on a programmed general purpose computer. However, the median filter system 200 can also be implemented on a special purpose computer, a programmed microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts above and/or shown in FIGS. 16 and 17, can be used to implement the image sharpening system.

The alterable memory 460 of the image sharpening system, as shown in FIG. 12, can be implemented using static or dynamic RAM. However, the alterable memory 460 can also be implemented using a floppy disk and disk drive, a writable optical disk and disk drive, a hard drive, flash memory or the like.

It should be understood that each of the elements 410–460 shown in FIG. 12 can be implemented as portions of a suitably programmed general purpose computer. Alternatively, each of the elements 410–460 shown in FIGS. 12 can be implemented as physically distinct hardware circuits within an ASIC, or using a FPGA, a PDL, a PLA or a PAL, or using discrete logic elements or discrete circuit elements. The particular form each of the elements 410–460 shown in FIG. 12 will take is a design choice and will be obvious and predicable to those skilled in the art.

Further, it should be appreciated that the signal lines or links 310 or 510 connecting the image data source 300 and the image data sink 500 to the median filter system 400 can be wired or wireless links to a network (not shown). The network can be a local area network, a wide area network, an intranet, the Internet, or any other distributed processing and storage network.

As shown in FIG. 12, the median filter system 400 is connected to the image data source 300. The image data source 300 provides multi-bit-valued image data. In general, the image data source can be any one of a number of different sources, such as a scanner, a digital copier, a camera, a facsimile device that is suitable for generating electronic image data, or a device suitable for storing and/or transmitting electronic image data, such as a client or server of a network, or the Internet, and especially the World Wide Web.

Similarly, an image data sink 101 can be any known or later developed device that is capable of receiving the enhanced image data output by the median filter system 400 and either storing, transmitting, or displaying the enhanced image data. Thus, the image data sink 101 can be either or both of a channel device for transmitting the enhanced image data for display or storage or a storage device for indefinitely storing the enhanced image data until there arises a need to display or further transmit the enhanced image data.

The channel device can be any known structure or apparatus for transmitting the enhanced image data from the median filter system 400 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the enhanced image data, such as a RAM, a hard drive and disk, a floppy drive and disk, an optical drive and disk, a flash memory or the like.

Moreover, the median filter system 400 can be implemented as software executing on a programmed general purpose computer, a special purpose computer, a microprocessor or the like. In this case, the median filter system 400 can be implemented as a routine embedded in a printer driver, as a resource residing on a server, or the like. The median filter system 400 can also be implemented by physically incorporating it into a software and/or hardware system, such as the hardware and software systems of a printer or a digital photocopier.

The image data source 300, the median filter system 400 and the image data sink 500 can be combined into an integrated device, such as a digital copier, computer with a built-in printer, or any other integrated device that is capable of producing a hard copy image output. With such a configuration, for example, one or both of the image data source 300 or sink 500 and the median filter system may be contained within a single device.

Determining the extrapolated values for a regular sampling grid is very simple. If the measured intensity or color at position i is V(i) the two extrapolated values at the spatial position X are $$V'(X)=2V(X-1)-V(X-2); \text{ and}$$

$$V''(X)=2V(X+1)-V(X+2),$$

where:

V(X−1) is the image value at a spatial position one grid step to a first side of the target pixel;

V(X−2) is the image value at a spatial position two grid steps to the first side of the target pixel;

V(X+1) is the image value at a spatial position one grid step to a second side of the target pixel opposite the first side;

V(X+2) is the image value at a spatial position two grid steps to the second side of the target pixel;

V'(X) is the first extrapolated image value at the spatial position X; and

V''(X) is the second extrapolated image value at the spatial position X.

The third value used to determine the median image value is V(X), which is the image value of the target pixel.

Because there are only three image values, the median image value of these three image values can be determined simply by comparing these image values. Given the image values V(X), V'(X) and V''(X), then if (V(X)>V'$_1$(X))
  if (V'$_1$(X)>V''$_2$(X))
    the median image value is V'(X)
  else if (V''(X)>V(X))
    the median image value is V(X)
  else
    the median image value is V''(X)
else if (V(X)>V''(X))
  the median image value is V(X)
else if (V''(X)>V'(X))
  the median image value is V'(X)
else
  the median image value is V''(X)

Figure 15:
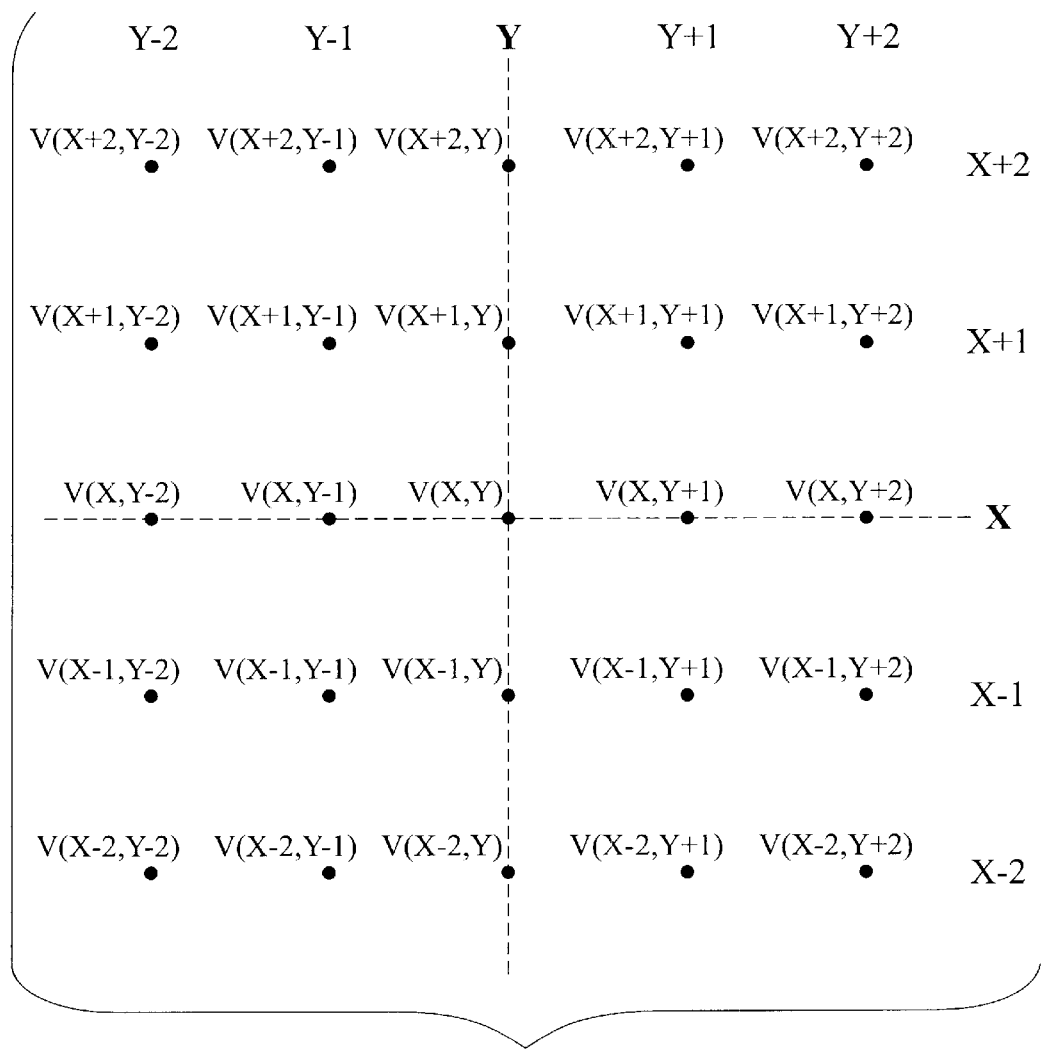
FIG. 15 is a schematic representation of twenty-five pixels illustrating one exemplary embodiment of the image enhancement system according to this invention.

Referring to the two-dimensional image shown in FIG. 15, for a target pixel at a spatial location X, Y, the process can be repeated several times to sharpen the edges across various directions. To sharpen vertical edges, the image values of horizontally neighboring pixels are used to generate the predicted image values:

$$V'_H(X, Y)=2V(X-1, Y)-V(X-2, Y); \text{ and} \quad (1)$$

$$V''_H(X, Y)=2V(X+1, Y)-V(X+2, Y); \quad (2)$$

where:

V(X−1, Y) is the image value at a spatial position one grid step to a first horizontal side of the target pixel;

V(X−2, Y) is the image value at a spatial position two grid steps to the first horizontal side of the target pixel;

V(X+1, Y) is the image value at a spatial position one grid step to a horizontal second side of the target pixel opposite the first horizontal side;

V(X+2, Y) is the image value at a spatial position two grid steps to the horizontal second side of the target pixel opposite the first horizontal side;

V'$_H$(X, Y) is the first extrapolated image value at the spatial position X; and V'$_H$(X, Y) is the second extrapolated image value at the spatial position X.

The third value used to determine the median image value is V(X, Y), which is the image value of the target pixel.

To sharpen horizontal edges, the image values of the vertically neighboring pixels are used to generate the predicted image values $$V'_V(X, Y)=2V(X, Y-1)-V(X, Y-2); \text{ and} \quad (3)$$

$$V''_V(X, Y)=2V(X, Y+1)-V(X, Y+2); \quad (4)$$

where:

V(X, Y−1) is the image value at a spatial position one grid step to a vertical first side of the target pixel;

V(X, Y−2) is the image value at a spatial position two grid steps to the vertical first side of the target pixel;

V(X, Y+1) is the image value at a spatial position one grid step to a vertical second side of the target pixel opposite the first vertical side;

V(X, Y+2) is the image value at a spatial position two grid steps to a vertical second side of the target pixel opposite the first vertical side;

V'$_V$(X, Y) is the first extrapolated image value at the spatial position X; and V''$_V$(X Y) is the second extrapolated image value at the spatial position X.

The third value used to determine the median image value is V(X, Y), which is the image value of the target pixel.

To sharpen diagonal edges, the image values of diagonally neighboring pixels are used to generate the predicted image values:

$$V'_{D1}(X, Y) = 2V(X-1, Y-1) - V(X-2, Y-2); \text{ and} \quad (5)$$

$$V''_{D1}(X, Y) = 2V(X+1, Y+1) - V(X+2, Y+2); \quad (6)$$

or $$V'_{D2}(X, Y) = 2V(X-1, Y+1) - V(X-2, Y+2); \text{ and} \quad (7)$$

$$V''_{D2}(X, Y) = 2V(X+1, Y-1) - V(X+2, Y-2); \quad (8)$$

where $V(X-1, Y-1)$ is the image value at a spatial position one grid step to a diagonal first side of the target pixel;

$V(X-2, Y-2)$ is the image value at a spatial position two grid steps to the diagonal first side of the target pixel;

$V(X+1, Y+1)$ is the image value at a spatial position one grid step to a diagonal second side of the target pixel opposite the first diagonal side;

$V(X+2, Y+2)$ is the image value at a spatial position two grid steps to the diagonal second side of the target pixel opposite the first diagonal side;

$V(X-1, Y+1)$ is the image value at a spatial position one grid step to a diagonal third side of the target pixel;

$V(X-2, Y+2)$ is the image value at a spatial position two grid steps to the diagonal third side of the target pixel;

$V(X+1, Y-1)$ is the image value at a spatial position one grid step to a diagonal fourth side of the target pixel opposite the third diagonal side; and $V(X+2, Y-2)$ is the image value at a spatial position two grid steps to the diagonal fourth side of the target pixel;

$V'_{D1}(X, Y)$ is the first extrapolated image value at the spatial position X;

$V''_{D1}(X, Y)$ is the second extrapolated image value at the spatial position X;

$V'_{D2}(X, Y)$ is the third extrapolated image value at the spatial position X; and $V''_{D2}(X Y)$ is the fourth extrapolated image value at the spatial position X.

The third value used (or fifth if both diagonals are used) to determine the median image value is $V(X, Y)$, which is the image value of the target pixel.

This invention can also be used to determine two or more of a first median value based on a horizontal series of pixels including the first pixel, a second median value based on a vertical set of pixels including the first pixel, and at least one third median value based on a diagonal series of pixels. The measured pixel value can then be replaced with the median value of all of the determined medians. Alternatively a standard average value or a weighted average value or some other value based on the determined medians can be used to replace the measured pixel value. The determination of the first median value, the second median value and the at least one third median value can be made simultaneously or sequentially in any order.

Alternatively, rather than linear extrapolations, non-linear extrapolations can be made. For example, second order or third order extrapolations can be made. Also alternatively, more than two neighboring pixels can be taken into account for each extrapolation. Also alternatively, the two or more neighboring pixels for each extrapolation can be located on different sides of the target pixel, rather than on one side of the target pixel.

Figure 8:
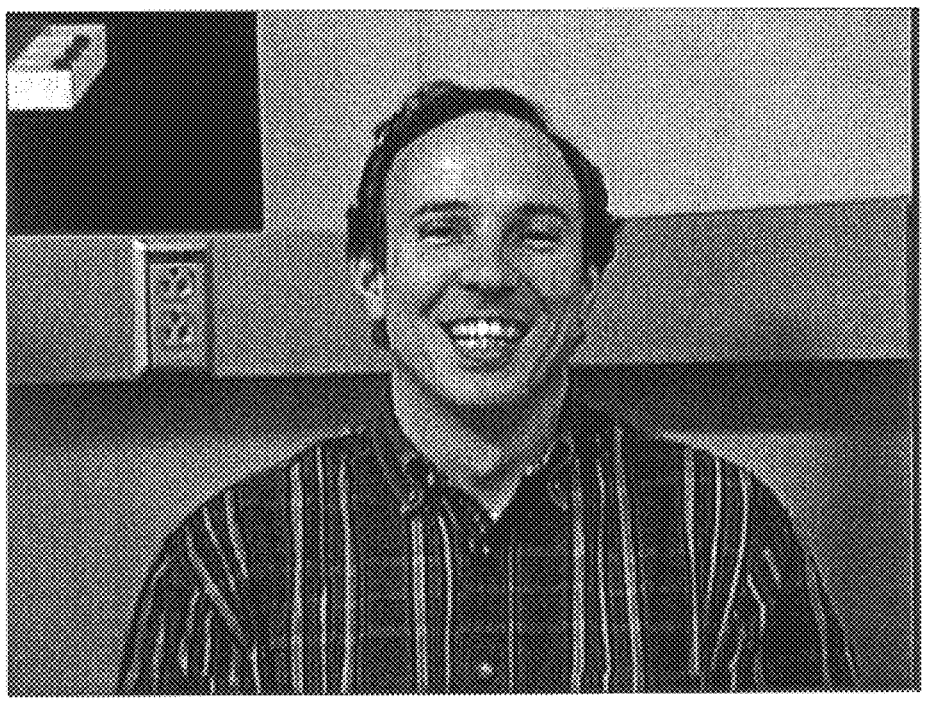
FIG. 8 is an image similar to that of FIG. 8 after being enhanced using a conventional image enhancing technique.
Figure 9:
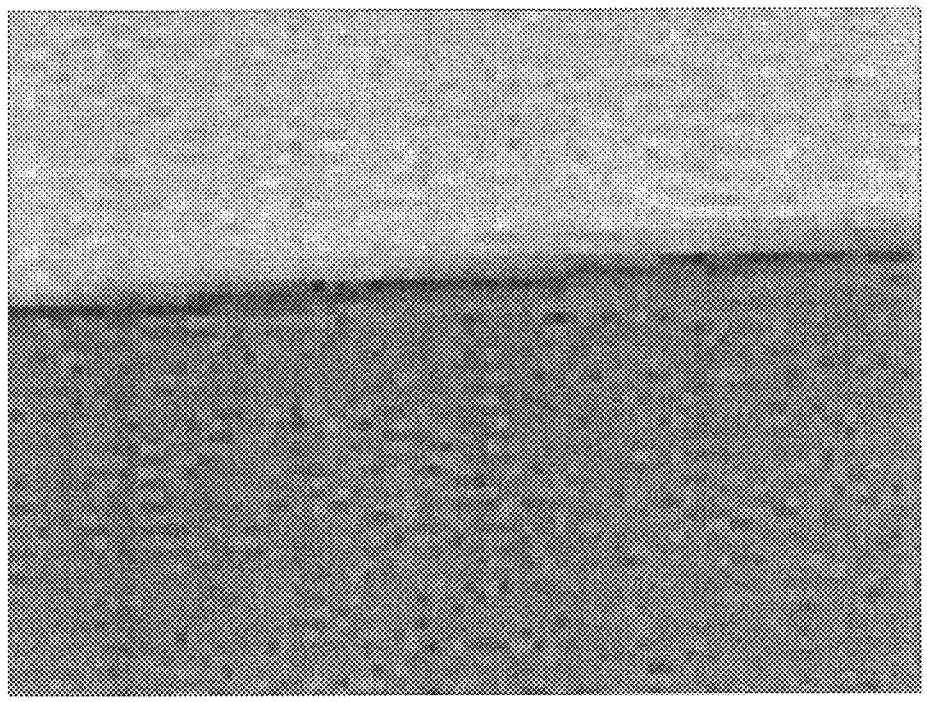
FIG. 9 is an enlarged portion of the conventionally enhanced image of FIG. 10, showing "ringing" at the edge and enhanced noise away from the edge.

FIGS. 6 and 7 show an original image captured from video with a blow-up of an edge and flat regions. Soft edges are clearly seen in the enlarged section of FIG. 7. FIGS. 8 and 9 show the effect of conventional edge enhancement, using the error-diffusion method, on the image. Edge ringing and noise can be seen in the enlarged section of FIG. 9. In FIGS. 13 and 14, the image has been processed by this invention with passes for the vertical, horizontal, and both diagonal directions. The enlarged section shown in FIG. 13 shows the improved behavior. The edge ringing is not as severe and the noise is actually reduced.

In another exemplary embodiment of the systems and methods of this invention, the image values from which the median image value is selected also includes the two immediate neighbor image values. This limits the edge enhancement to within these two image values when the target pixel lies between them.

For example, again referring to FIG. 15, if it is desired to process a target pixel $V(X, Y)$ in the horizontal direction, the average values of the pixels neighboring this target pixel are $V(X, Y-1)$, $V(X, Y-2)$ on one side and $V(X, Y+1)$, $V(X, Y+2)$ on the other side. Therefore, the set of five image values from which the median value will be selected is:

$\{V(X,Y); V'(X, Y); (V''(X, Y); V(X, Y-1); \text{ and } V(X, Y+1)\}$ where $V'(X, Y)$ and $V''(X, Y)$ are determined above as in Equations 1 and 2. The new image value for $V(X, Y)$ for the target pixel is the median of these five image values.

It is noted that in this exemplary embodiment of the methods of this invention, because the generated image values do not "overshoot" edges, images enhanced using this exemplary embodiment of the methods of this invention will tend not to appear as sharp as in the earlier described embodiment of the methods of this invention. However, the edges in this exemplary embodiment of the methods of this invention will actually be closer to ideal edges, and may provide better images for later processing, such as scaling.

This exemplary embodiment of the methods of this invention can also be used in conjunction with more conventional methods and systems.

FIGS. 16 and 17 show an image that has been processed by this embodiment of this invention with passes for the vertical, horizontal, and both diagonal directions. The enlarged section shown in FIG. 17 again shows the improved behavior. Again, the edge ringing is not severe and the noise is reduced in comparison to FIGS. 8 and 9.

Figure 18:
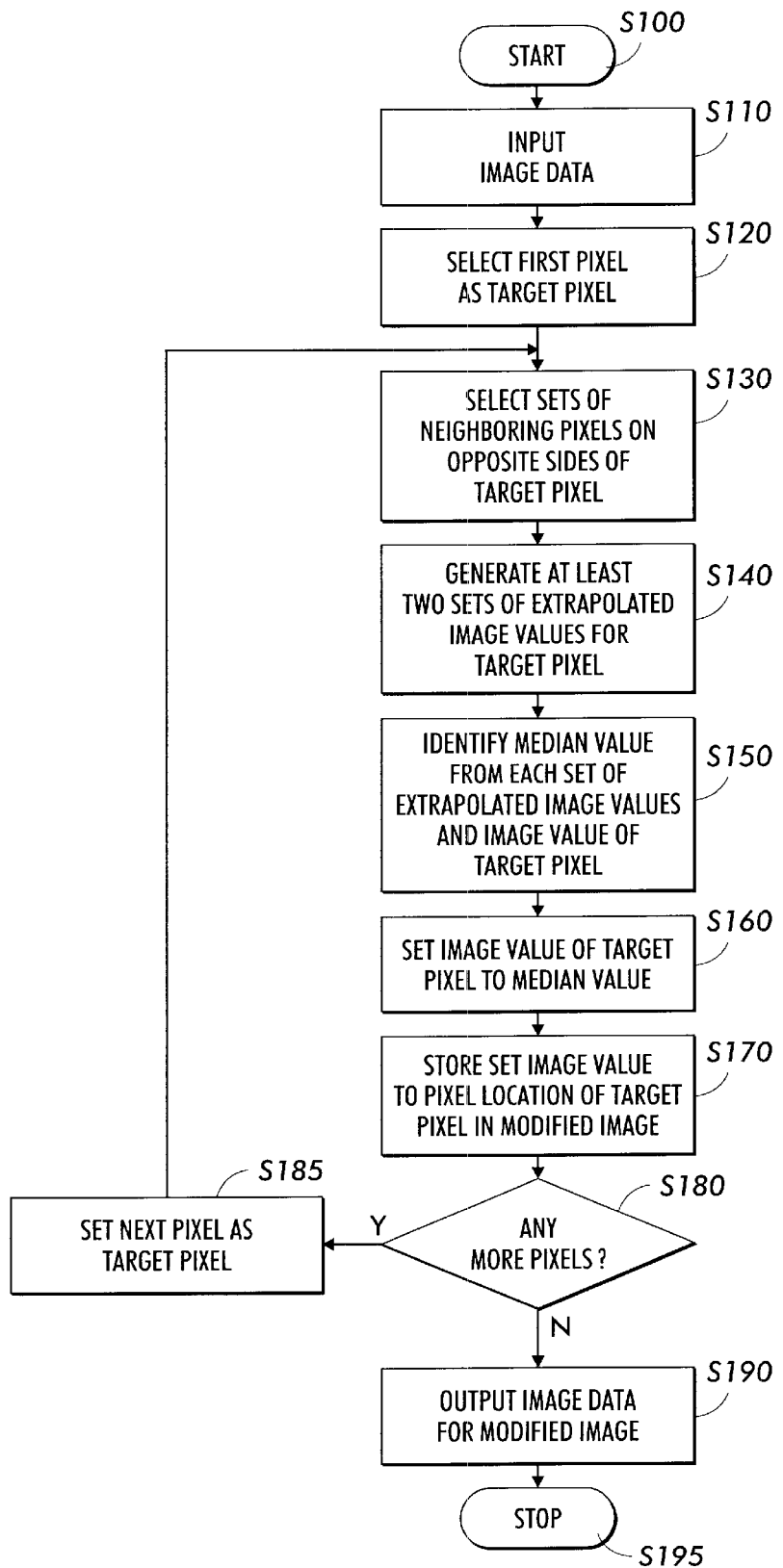
FIG. 18 is a flow chart outlining one exemplary embodiment of the image enhancement process according to this invention.

FIG. 18 is a flowchart outlining one exemplary embodiment of a process for median filtering of this invention. Beginning in step S100, control continues to step S110, where the image data is input. Then, in step S120, a first pixel is selected as the target pixel. Next, in step S130, one or more sets of neighboring pixels on opposite sides of the target pixel are selected. Control then continues to step S140.

In step S140, sets of extrapolated image values are generated for the target pixel from the image values of the neighboring pixels on each side of the target pixel for each set of neighborhood pixels. Next, in step S150, the median value of each set of extrapolated image values and the image value of the target pixel is identified. Then, in step S160, the image value of the target pixel is set to the median value determined in step S150. Control then continues to step S170.

In step S170, the set image value is stored to the pixel location of the target pixel in a modified image. Then, in step S180, a determination is made if any more pixels need to be analyzed. If there are additional pixels that need to be analyzed, control continues to step S185. Otherwise, control jumps to step S190. In step 185, the next pixel to be analyzed is selected as the target pixel. Control then jumps back to step S130. In contrast, in step S190, the image data for the modified image is output. Then, in step S195, the process ends.

In most applications of this invention, every pixel is analyzed. However, the methods and systems of this invention could be applied selectively using any selection criteria desired. For example, the methods and systems of this invention could be applied only where edges are detected, such as where there are large differences between the values of neighboring pixels, or to areas of high variance, such as where the values of pixels differ greatly from the average value for the pixels in the same neighborhood.

Figure 19:
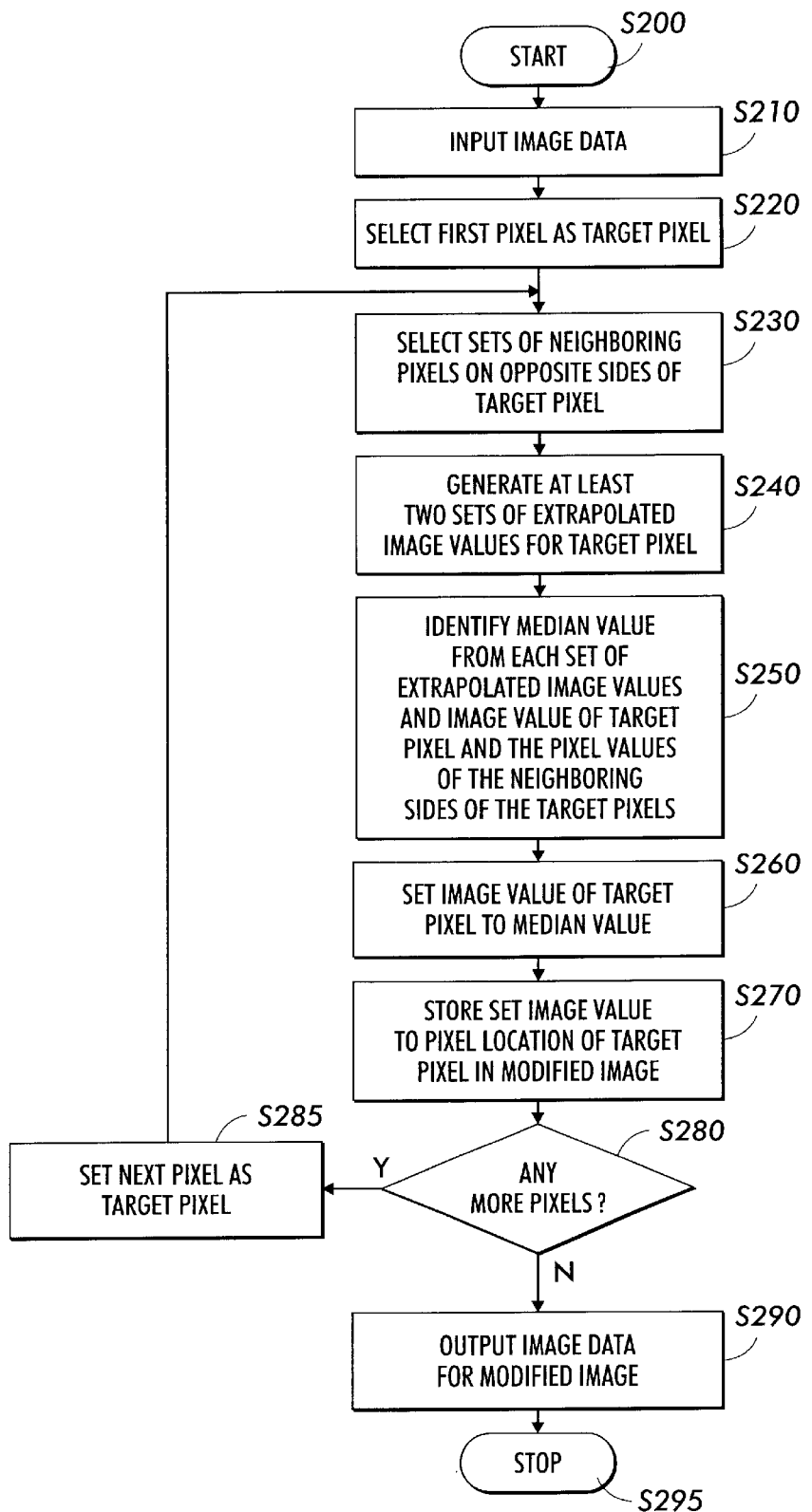
FIG. 19 is a flow chart outlining one other exemplary embodiment of the image enhancement system according to this invention.

FIG. 19 is a flow chart for the steps of another embodiment of the process of this invention in which the median is selected from the value for the target pixel, extrapolated values from opposite sides of the target pixel and also the image values of pixels on opposite sides of the target pixel. Beginning in step S200, control continues to step S210, where the image data is input. Then, in step S220, a first pixel is selected as the target pixel. Next, in step S230, one or more sets of neighboring pixels on opposite sides of the target pixel are selected. Control then continues to step S240.

In step S240, sets of extrapolated image values are generated for the target pixel from the image values of the neighboring pixels on each side of the target pixel for each set of neighborhood pixels. Next, in step S250, the median value of the sets of extrapolated image values, the image values of one or more neighboring pixels on each side of the target pixel and the image value of the target pixel is identified. Then, in step S260, the image value of the target pixel is set to the median value determined in step S250. Control then continues to step S270.

In step S270, the set image value is stored to the pixel location of the target pixel in a modified image. Then, in step S280, a determination is made if any more pixels need to be analyzed. If there are additional pixels that need to be analyzed, control continues to step S285. Otherwise, control jumps to step S290. In step S285, the next pixel to be analyzed is selected as the target pixel. Control then jumps back to step S230. In contrast, in step S290, the image data for the modified image is output. Then, in step S295, the process ends.

In both methods, vertical, horizontal and diagonal edges can be enhanced. For example, to sharpen the vertical edge, the two predicted values are found by extrapolating the image values of the neighbors horizontally adjacent to the target pixel. To sharpen a horizontal edge, the two predicted values are found by extrapolating the image values of the neighbors vertically adjacent to the target pixel. To sharpen a diagonal edge, the two predicted values are found by extrapolating the image values of the neighbors diagonally using adjacent to the target pixel. The method can be applied consecutively to two or more directions and gain sharpening from each.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A method for sharpening an image consisting of a plurality of pixels each pixel having a pixel value, comprising:

selecting a first pixel;

determining a first pixel value for the first pixel;

determining a first extrapolated pixel value for the first pixel value from pixel values for at least a second pixel and a third pixel located in the neighborhood of the first pixel;

determining a second extrapolated pixel value for the first pixel from at least a fourth pixel and a fifth pixel located in the neighborhood of the first pixel;

determining a median pixel value from the first pixel value for the first pixel, the first extrapolated pixel value and the second extrapolated pixel value; and replacing the first pixel value with the median pixel value.

2. The method of claim 1, wherein the pixel values for the at least a second pixel and a third pixel are located on a first side of the first pixel; and the at least a fourth pixel and a fifth pixel are located on a second side of the first pixel opposite the first side.

3. The method of claim 1, further comprising generating a first predicted pixel value for the first pixel by linearly or non-linearly extrapolating the pixel values for the second pixel and the third pixel to the first pixel; and generating a second predicted pixel value for the first pixel by linearly or non-linearly extrapolating the pixel values for the fourth pixel and the fifth pixel to the first pixel.

4. The method of claim 3, wherein the second pixel and fourth pixel are each spaced a first distance from the first pixel and the third pixel and fifth pixel are each spaced a second distance from the first pixel.

5. The method of claim 4, wherein the second distance is twice the first distance.

6. The method of claim 4, wherein the first and second extrapolated values are determined as:

$$V'(X)=2V(X-1)-V(X-2); \text{ and}$$

$$V''(X)=2V(X+1)-V(X+2),$$

where:

$V(X-1)$ is the image value at a spatial position one grid step to a first side of the target pixel;

$V(X-2)$ is the image value at a spatial position two grid steps to the first side of the target pixel;

$V(X+1)$ is the image value at a spatial position one grid step to a second side of the target pixel opposite the first side;

$V(X+2)$ is the image value at a spatial position two grid steps to the second side of the target pixel;

$V'(X)$ is the first extrapolated image value at the spatial position X; and $V''(X)$ is the second extrapolated image value at the spatial position X.

7. The method of claim 4, wherein the third pixel, second pixel, first pixel, fourth pixel and fifth pixel are a series of adjacent pixels.

8. The method of claim 5, wherein the series of adjacent pixels is a vertical series of adjacent pixels, such that a horizontal edge is sharpened.

9. The method of claim 5, wherein the series of adjacent pixels is a horizontal series of adjacent pixels, such that a vertical edge is enhanced.

10. The method of claim 5, wherein the series of adjacent pixels is a diagonal series of adjacent pixels, such that a diagonal edge is enhanced.

11. The method of claim 5, further comprising determining at least two of a first median value based on a horizontal series of pixels including the first pixel, a second median value based on a vertical set of pixels including the first pixel, and at least one third median value based on a diagonal series of pixels, wherein the measured pixel value is replaced with the median value or a standard average value or a weighted average value of the first median value, the second median value and the at least one third median value, and wherein determination of the first median value, the second median value and the third median value is made simultaneously or sequentially in any order.

12. The method of claim 4, wherein each pixel value is replaced by the median of a set of values which includes two intermediate neighbor values on each side of the pixel.

13. The method of claim 1, further comprising capturing an image.

14. The method of claim 1, further comprising capturing an image, storing the image and printing the sharpened image.

15. The method of claim 1, further comprising determining a median pixel value from among the first pixel value for the first pixel, the pixel value for the second pixel, the pixel value for the fourth pixel, the first predicted pixel value for the first pixel and the second predicted pixel value for the first pixel; and replacing the first pixel value with the median pixel value.

16. A system for image enhancement, comprising
 an image source that supplies an image;
 a pixel value determinator;
 an image sink;
 a determinator for determining a pixel value for at least a first pixel to provide a first pixel value;
 a determinator for determining a pixel value for a second pixel and a pixel value for a third pixel located on a first side of the first pixel;
 a determinator for determining a pixel value for a fourth pixel and a pixel value for a fifth pixel located on a second side of the first pixel; the second side being directly opposite the first side with respect to the first pixel;
 a predictor for generating a first predicted pixel value for the first pixel by linearly extrapolating the pixel values for the second pixel and the third pixel to the first pixel;
 a predictor for generating a second predicted pixel value for the first pixel by linearly extrapolating the pixel values for the fourth pixel and the fifth pixel to the first pixel;
 a determinator for determining a median pixel value from among the first pixel value for the first pixel, the first predicted pixel value for the first pixel and the second predicted pixel value for the first pixel;
 a replacer for replacing the first pixel value with the median pixel value.

17. The system of claim 16, wherein the image capturing device is one of a scanner and an electrophotographic, a medical imaging device, an x-ray device, a catscan device or an NMR device.

18. The system of claim 16, wherein the image displaying device is one of a monitor and a printer.

19. The system of claim 16, wherein the determinator for determining a median pixel value determines a median value from among the first pixel value for the first pixel, the first predicted pixel value for the first pixel, the second predicted pixel value for the first pixel, the pixel value for the second pixel and the pixel value for the fourth pixel.

20. The system of claim 19, wherein the image capturing device is one of a scanner, an electrophotographic camera, a medical imaging device, an x-ray device, a catscan device or an NMR device and wherein the image displaying device is one of a monitor and a printer.

* * * * *